US 6,678,863 B1

(12) United States Patent
Sugiyama

(10) Patent No.: US 6,678,863 B1
(45) Date of Patent: *Jan. 13, 2004

(54) COMMUNICATION SYSTEM, INFORMATION PROCESSING APPARATUS, OUTPUT APPARATUS, CONTROL METHOD, AND MEMORY MEDIUM

(75) Inventor: Hideki Sugiyama, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,637

(22) Filed: Aug. 25, 1999

(30) Foreign Application Priority Data

Aug. 28, 1998 (JP) .......................... 10-243431

(51) Int. Cl.⁷ .................. G06F 11/00; G08C 25/00; H03M 13/00; H04L 1/00
(52) U.S. Cl. ................................ 714/799
(58) Field of Search ........................... 714/799

(56) References Cited

U.S. PATENT DOCUMENTS

| | | | | |
|---|---|---|---|---|
| 4,503,535 A | * | 3/1985 | Budde et al. ............... 714/47 |
| 4,521,848 A | * | 6/1985 | Bruce et al. ............... 714/43 |
| 4,860,119 A | * | 8/1989 | Maniwa et al. ............ 358/296 |
| 4,914,657 A | * | 4/1990 | Walter et al. ............... 714/4 |
| 5,790,408 A | * | 8/1998 | Richardson et al. ........ 700/223 |
| 5,895,140 A | * | 4/1999 | Koh et al. .................... 399/77 |
| 5,923,442 A | * | 7/1999 | Miyaoka ..................... 358/442 |
| 5,935,262 A | * | 8/1999 | Barrett et al. ................ 714/46 |
| 5,937,151 A | * | 8/1999 | Kadota ....................... 358/1.15 |
| 6,040,792 A | * | 3/2000 | Watson et al. ............. 341/100 |
| 6,067,407 A | * | 5/2000 | Wadsworth et al. ....... 709/250 |
| 6,147,765 A | * | 11/2000 | Yoneda ..................... 358/1.15 |
| 6,218,969 B1 | * | 4/2001 | Watson et al. ............. 341/100 |
| 6,246,485 B1 | * | 6/2001 | Brown et al. .............. 358/1.13 |
| 6,289,371 B1 | * | 9/2001 | Kumpf et al. .............. 709/203 |

OTHER PUBLICATIONS

IEEE Std 1284–1994, IEEE Standard Signaling Method for a Bidirectional Parallel Peripheral Interface for Personal Computers.*

* cited by examiner

Primary Examiner—Albert Decady
Assistant Examiner—Joseph D. Torres
(74) Attorney, Agent, or Firm—Fitzpatrick, Cella, Harper & Scinto

(57) ABSTRACT

It is an object to allow an output apparatus to certainly recognize an error when the error occurs at the time of a data transfer using an upper layer (IEEE 1284.4). In a communication system in which an information processing apparatus and an output apparatus can communicate data by using an interface constructed by the upper layer (IEEE 1284.4) and a lower layer (IEEE 1284), when the information processing apparatus detects an error at the time of a data communication using the upper layer, a, predetermined command (device ID request) specified in the lower layer is used in order to allow the output apparatus to recognize the occurrence of the error.

15 Claims, 4 Drawing Sheets

COMMUNICATION SYSTEM, INFORMATION PROCESSING APPARATUS, OUTPUT APPARATUS, CONTROL METHOD, AND MEMORY MEDIUM

BACKGROUND OF THE INVENTION

1. Field of the Invention

The invention relates to a communication system for communicating data by using an interface comprising an upper layer and a lower layer, an information processing apparatus, an output apparatus, a control method, and a memory medium.

2. Related Background Art

Hitherto, a PC parallel interface added with a plurality of modes for providing a high speed bidirectional communication between devices has been defined in IEEE 1284. In IEEE 1284, however, a protocol called a "transport protocol" for a Point-to-Point link is not defined. In IEEE 1284.4, a Point-to-Point protocol regarding several layers locating at intermediate stages between a physical interface and an application layer is designated. Such a protocol has functions and characteristics of a transport layer and a session layer in the OSI model. Further, a method of performing a bidirectional communication as a data communication between a host and a printer on the basis of IEEE 1284.4 has been proposed.

IEEE 1284.4 is a packet protocol to simultaneously transmit and receive a plurality of information (data and control information) by using one Point-to-Point link connected between two devices. The protocol, however, provides a flow control and a multiplexing service at a basic transport level instead of control information (control command) of the device. Multiplexed logical channels are independent and even if a certain channel is closed, the other channels are not influenced. Although the protocol presumes that it is operated on the IEEE 1284 interface, it can be operated on another Point-to-Point interface.

When an IEEE 1284.4 error occurs, however, the side which detects the error occurrence has to transmit an Error command specified in IEEE 1284.4 and an Exit command specified in IEEE 1284.4 to the communication partner side, receive an ExitReply command specified in IEEE 1284.4, and finish the IEEE 1284.4 mode. To resume the communication by IEEE 1284.4, the side which detected the error has to finish the communication once by IEEE 1284.4 and start the communication again by an Init command specified in IEEE 1284.4.

It is not guaranteed that the transmission and reception of the commands in an error occurring situation succeed and there is also a case where the side which detected the error has to wait for the ExitReply command permanently.

In an output apparatus having a function which does not use a bidirectional function, it the cause of the IEEE 1284.4 error is that the bidirectional function is not used during the operation of IEEE 1284.4, the ExitReply command is never issued from the output apparatus.

Among output apparatuses having an automatic switching apparatus of the IEEE 1284.4 mode and the IEEE 1284 mode (generally, referred to as a Centronics), as for the output apparatus which operates in the IEEE 1284 mode at the time of turn-on of a power supply, if the cause of the IEEE 1284.4 error is a turn-off and a re-turn-on of the power supply, the Error command and Exit command are erroneously recognized as a part of print data in the IEEE 1284.4 mode.

SUMMARY OF THE INVENTION

To solve the above problems, it is an object of the invention that when an error occurs in an upper layer (for example, IEEE 1284.4), an output apparatus is allowed to certainly recognize the error by using a predetermined command (for example, a device ID request specified in IEEE 1284.4) of a lower layer.

To accomplish the above object, according to the invention, there is provided a communication system comprising an information processing apparatus and an output apparatus for outputting in accordance with data from the information processing apparatus, wherein the information processing apparatus and the output apparatus can communicate data by using an interface constructed by an upper layer and a lower layer, and when the information processing apparatus detects an error at the time of the data communication using the upper layer, a predetermined command specified in the lower layer is used for allowing the output apparatus to recognize the occurrence of the error.

According to the invention, there is provided an information processing apparatus which can communicate data with an output apparatus by using an interface comprising an upper layer and a lower layer, wherein the apparatus has issuing means for issuing a predetermined command specified in the lower layer in order to allow the output apparatus to recognize the occurrence of an error when the error is detected at the time of the data communication using the upper layer.

According to the invention, there is provided an output apparatus which can communicate data with an information processing apparatus by using an interface comprising an upper layer and a lower layer, wherein the apparatus has control means for performing a resetting process when a predetermined command specified in the lower layer is received at the time of the data communication using the upper layer.

According to the invention, there is provided a control method of an information processing apparatus which can communicate data with an output apparatus by using an interface comprising an upper layer and a lower layer, wherein the method has an issuing step of issuing a predetermined command specified in the lower layer in order to allow the output apparatus to recognize the occurrence of an error when the error is detected at the time of the data communication using the upper layer.

According to the invention, there is provided a control method of an output apparatus which can communicate data with an information processing apparatus by using an interface comprising an upper layer and a lower layer, wherein the method has a control step of performing a resetting process when a predetermined command specified in the lower layer is received at the time of the data communication using the upper layer.

According to the invention, there is provided a machine-readable memory medium which stores a control program of an information processing apparatus which can communicate data with an output apparatus by using an interface comprising an upper layer and a lower layer, wherein the control program has an issuing step of issuing a predetermined command specified in the lower layer in order to allow the output apparatus to recognize the occurrence of an error when the error is detected at the time of the data communication using the upper layer.

According to the invention, there is provided a machine-readable memory medium which stores a control program of an output apparatus which can communicate data with an information processing apparatus by using an interface comprising an upper layer and a lower layer, wherein the control program has a control step of performing a resetting process when a predetermined command specified in the lower layer is received at the time of the data communication using the upper layer.

DETAILED DESCRIPTION OF THE PREFERRED EMBODIMENTS

Figure 1:
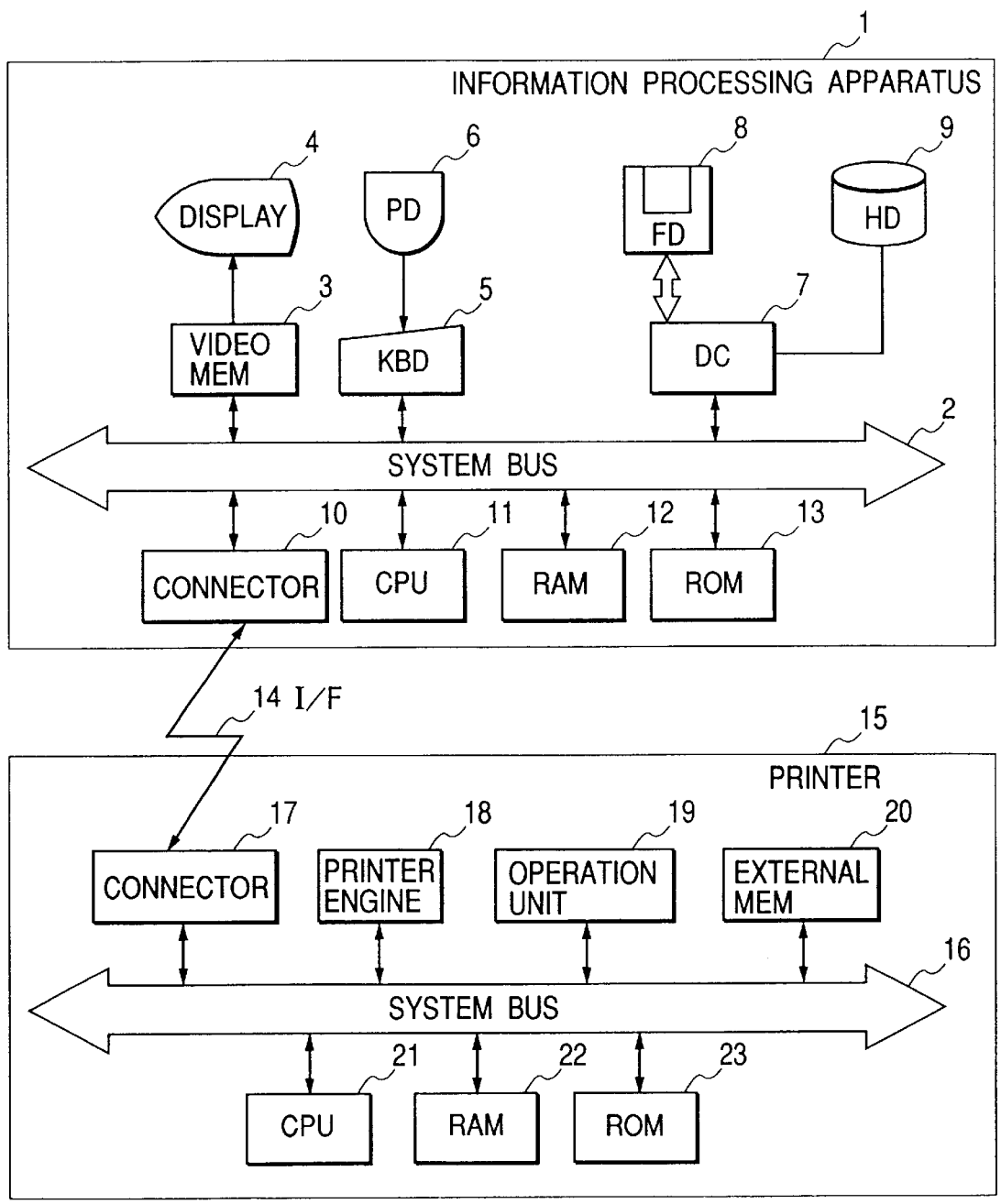
FIG. 1 is a diagram showing an example of a system construction of a print system of the invention.

FIG. 1 is a block diagram showing a construction of a print processing apparatus in an embodiment of the invention. In the diagram, reference numeral 1 denotes an information processing apparatus such as a personal computer or the like. As main component elements, the information processing apparatus comprises a video memory 3, a display 4, a keyboard (KBD) 5, a pointing device (PD) 6, a disk controller (DC) 7, a hard disk drive (HD) 9, a connector 10, a CPU 11, an RAM 12, and an ROM 13, which will be explained hereinlater in detail. Those component elements are mutually connected via a system bus 2. The CPU 11 controls the whole information processing apparatus 1 in accordance with a program which is expressed by a flowchart of FIG. 2 or the like, which will be explained hereinlater. The RAM 12 stores programs as a main memory of the CPU 11 and has a temporary memory area of various data which is used as a work data area at the time of execution of a control by the CPU 11. The disk controller 7 performs an access control with the hard disk drive (HD) 9 as an external memory or an external memory device such as a floppy disk (FD) 8 or the like. The hard disk drive (HD) 9 and floppy disk (FD) 8 are devices for recording data onto a disk-shaped magnetic memory medium and reading and writing data and stores: various graphic data and text data; further, a boot program of the information processing apparatus 1 which is downloaded into the ROM 13 and executed; an operating system (OS) as a control program of the CPU 11; various application programs; a printer control command (print data) generating program (printer driver); a print system program having a page control function; and the like. The memory device is not limited only to the hard disk drive or floppy disk but can be a device using a memory medium such as magnetic tape, CD-ROM, IC memory card, DVD, or the like. The ROM 13 is an internal memory which stores various data and programs in a manner similar to the foregoing hard disk drive (HD) 9, floppy disk (FD) 8, or the like. The display 4 displays, on a screen, various diagrams such as bit map data or the like, a command image of a command menu, a message of the operator, and the like which is used in the information processing apparatus 1 and is constructed by a CRT (cathode ray tube), a liquid crystal display, or the like. The video memory 3 is a VRAM, for example, and stores data to be displayed on the display 4. Each of the keyboard 5 and pointing device 6 is operated by the operator and is used to input various data, commands, print mode, or the like. By selecting a command image or the like in a command menu displayed on the screen of the, display 4 by the keyboard 5 and pointing device 6, the execution of the command or the printing mode can be instructed. The connector 10 is connected to a connector 17 of a printer 15 through a predetermined bidirectional interface 14 such as centronics interface, network interface, or infrared interface and executes a communication control process with the printer 15, which will be explained hereinlater, by transmitting a printer control command (print data) or the like. The printer 15 comprises the connector 17, a printer engine 18, an operation unit 19, an external memory 20, a CPU 21, an RAM 22, and an ROM 23 as main component elements, which will be explained in detail hereinlater. Those component elements are mutually connected via a system bus 16.

The CPU 21 is a printer CPU and controls the whole printer 15. The CPU 21 transmits an image signal to the printer engine 18 by the printer control command (print data) received by the connector 17 on the basis of the control program stored in the ROM 13 or external memory 20, which will be explained hereinlater. As a main memory of the CPU 21, the RAM 22 has a temporary memory area of various data which is used as a work data area when the control is executed by the CPU 21. The external memory 20 is also connected as an option and stores font data, emulation program, form data, or the like. The ROM 23 is an internal memory of the printer and stores various data, a printer control program to control the printer, and the like in a manner similar to the external memory.

The printer engine 18 is controlled by the CPU 21, receives the image signal outputted via the system bus, and performs the actual printing by the control program stored in the ROM 23 or external memory 20. The operation unit 19 is constructed by an input unit of an operation panel and operation switches, a display unit of an LED or a liquid crystal display panel, and the like, receives the operation of the operator and displays the operation result. The operator can instruct and confirm the setting of the printer 15 through the operation unit 19. The connector 17 is connected to the connector 10 of the information processing apparatus 1 via the bidirectional interface 14 and can receive the printer control command (print data) and notify of a status in the printer or the like.

Figure 2:
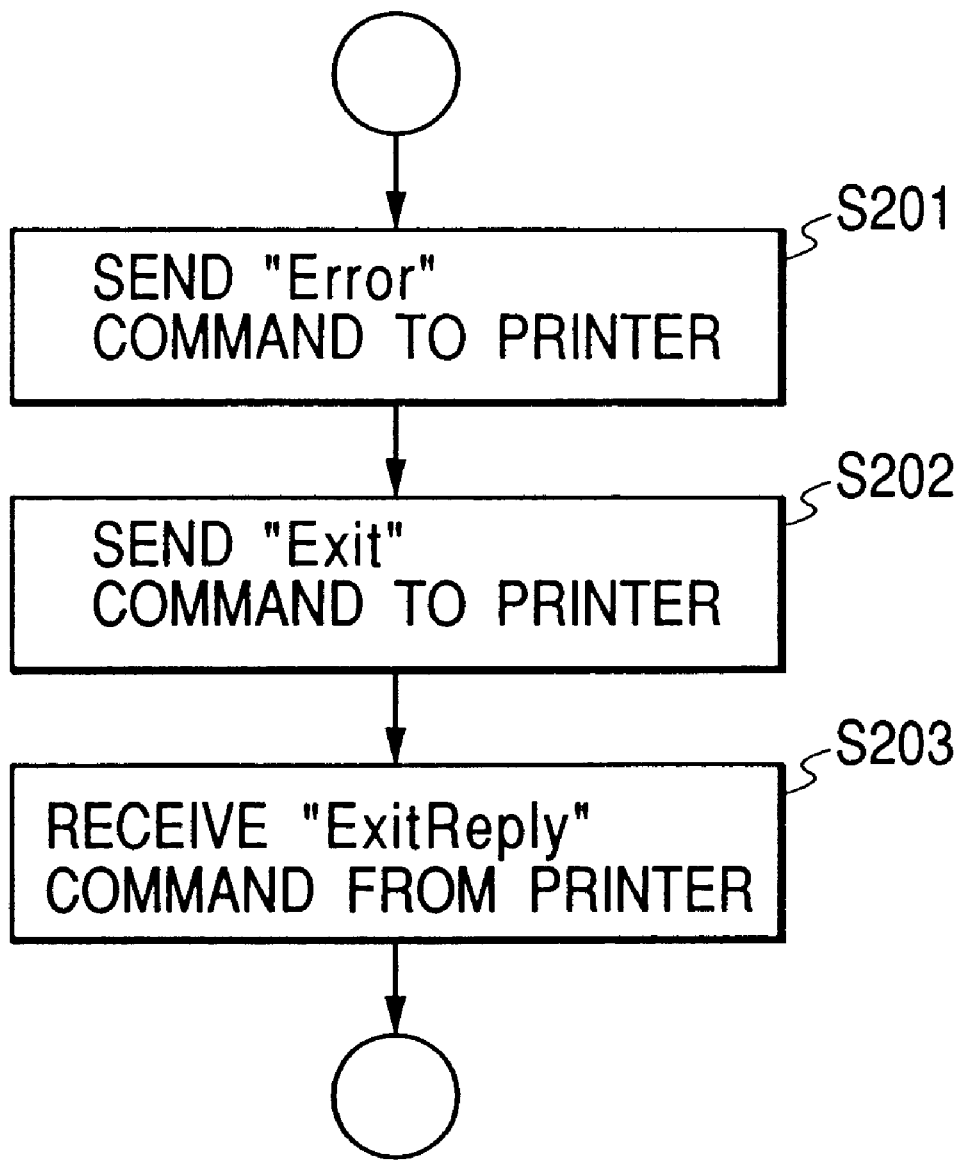
FIG. 2 is a diagram showing a flowchart for an error process.

FIG. 2 is a flowchart for explaining an ordinary error process and is based on the program which is executed on the information processing apparatus side.

The ordinary error process and its problems will now be described hereinbelow with reference to FIG. 2.

As IEEE 1284.4 errors which are detected by the information processing apparatus, the following errors can be mentioned.

(1) Illegality of a header and data.

(2) Illegality of a packet length.

(3) A reply did not come in response to the command transmission.

(4) Although there is a credit, a packet could not be transmitted.

(5) Illegality of the command transmitting order.

(6) Reception of a packet to the illegal channel.

. . . and the like.

The errors of (1), (2), and (6) are detected by the CPU 11 by checking the matching of the packet received from the printer via the bidirectional interface 14.

As for the error of (3), in the case where the elapsed time after the command formed by the control program which had been executed by the CPU 11 was transmitted to the communication partner via the connector 10 or 17 through the bidirectional interface 14 is calculated by the CPU 11 and, when a command reply cannot be received even after the elapse of a predetermined time-out time, it is determined as an error.

As for the error of (5), when it is determined that the order of the commands received from the communication partner through the bidirectional interface 14 differs from that specified in IEEE 1284.4 by the control program executed by the CPU 11 and stored in the ROM 13 or a memory resource (not shown), it is determined as an error.

As for the errors, the following causes are considered.
(a) Drop-out of bits of data due to abnormality of a transmission path.
(b) Transmission is disabled due to the turn-off of a power supply.
(c) The printer is skipped from the IEEE. 1284.4 mode.
(d) Bidirectional communication of the printer is disabled.
. . . and the like.

The information processing apparatus which detected the error tries to inform the printer of the error detection in accordance with a procedure disclosed in IEEE 1284.4. First in step S201, the CPU 11 executes the control program stored in the ROM 13 or memory resource (not shown), forms an Error command, stores it into the RAM 12, and transmits the Error command to the printer via the system bus 2 and connector 10 through the bidirectional interface 14. When the cause of the error occurrence is (b), the printer side is not in a reception preparing state, so that the command transmission in step S201 fails. When the cause of the error occurrence is other than (b), the command transmission in step S201 succeeds. When it is successful, step S202 follows. The CPU 11 executes the control program stored in the ROM 13 or memory source (not shown), forms an Exit command, stores it into the RAM 12, and transmits a printer Exit command via the system bus 2 and connector 10 through the bidirectional interface 14. Subsequently in step S203, the CPU 11 sets the data transfer direction of the bidirectional interface 14 to the reverse direction (from the printer to the information processing apparatus) by a predetermined procedure specified in IEEE 1284 and receives an ExitReply command from the printer through the bidirectional interface 14. In this instance, when the cause of the error occurrence is (d) or (c), the ExitReply command is not sent from the printer, so that the command reception in step S203 fails or the process is never finished. When the cause of the error occurrence is (a), there is a possibility such that the drop-out of the bits again occurs in all of the transmission and reception, and there is a possibility such that a new packet abnormality occurs on the command receiving side.

Error processes which can solve the above problems will now be described with reference to FIGS. 3 and 4.

Figure 3:
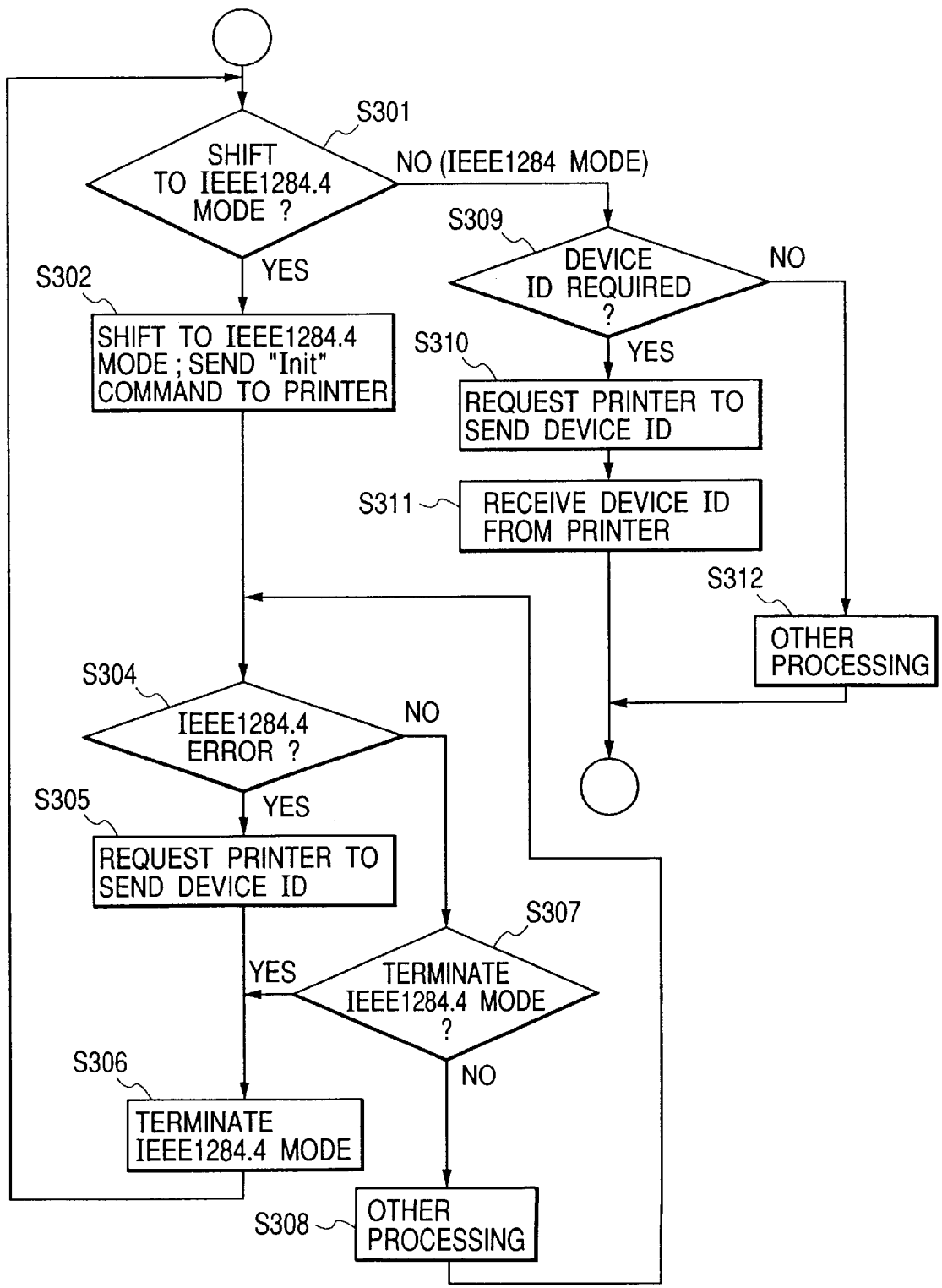
FIG. 3 is a diagram showing a flowchart on the side of an information processing apparatus of the invention.
Figure 4:
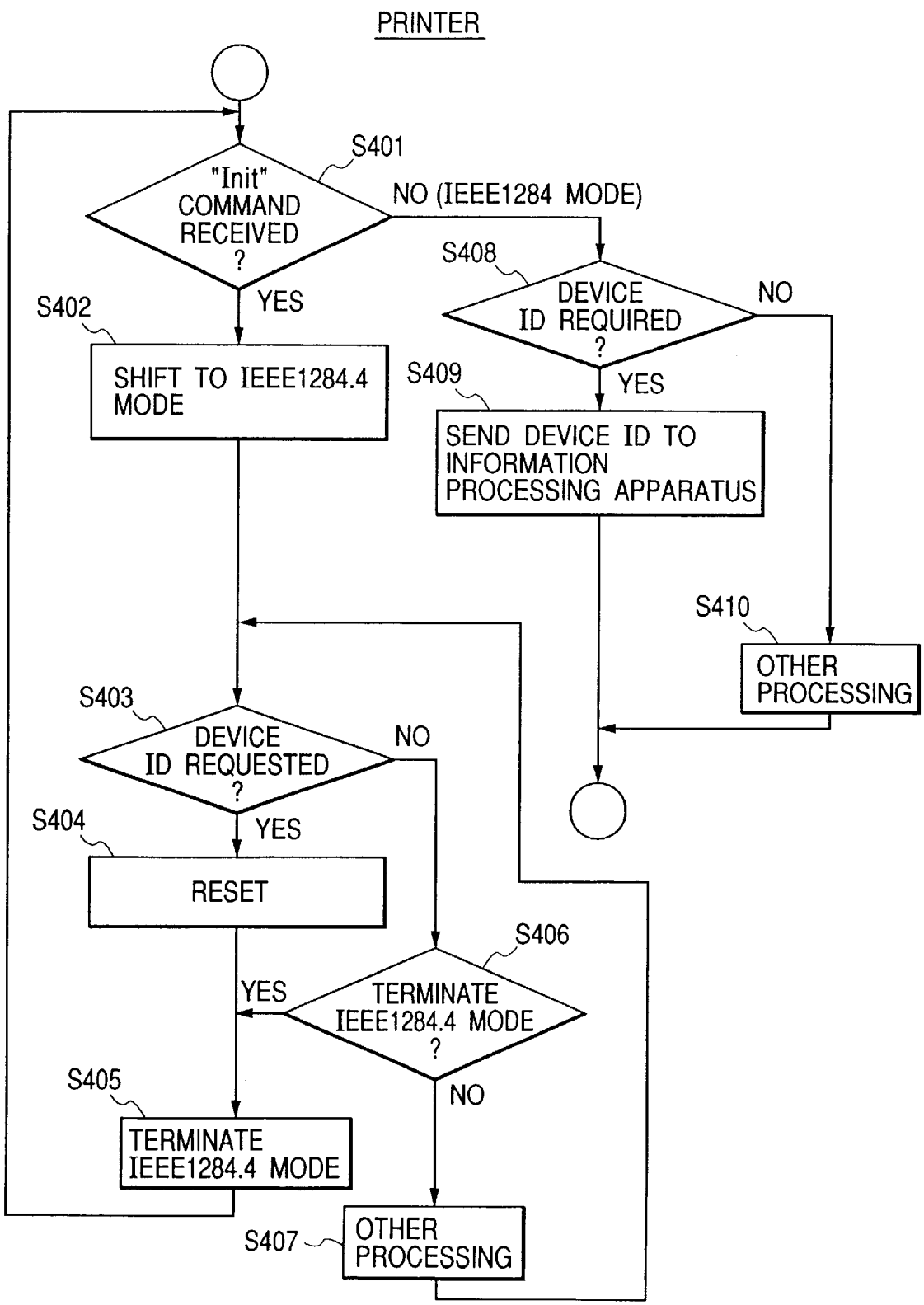
FIG. 4 is a diagram showing a flowchart on the side of a printer of the invention.

FIG. 3 is a flowchart regarding the control program stored in the ROM 13 on the information processing side.

First, the CPU 11 discriminates whether a shift command to the IEEE 1284.4 mode has been issued or not in step S301.

In the embodiment, the shift command to the IEEE 1284.4 mode is fundamentally issued in accordance with a print instruction by the user (when a condition such that the IEEE 1284.4 mode is not used is preset by the user, the IEEE 1284.4 mode shift command is not issued). This shift command is also issued when it is necessary to restart the operation after the occurrence of the IEEE 1284.4 error.

If YES in step S301, step S302 follows. The operating mode is shifted to the IEEE 1284.4 mode and an Init command is sent to the printer. In step S304, a check is made to see if the IEEE 1284.4 error has occurred. If YES in step S304, step S305 follows. A device ID specified in IEEE 1284 is requested to the printer. Step S306 follows and the IEEE 1284.4 mode is terminated. The processing routine is returned to step S301.

If NO in step S304, step S307 follows and a check is made to see if the IEEE 1284.4 mode is terminated. If YES, step S306 follows. If NO, step S308 follows and another processing (process to send the print data or the like) is performed. The processing routine is returned to step S304.

If NO in step S301, step S309 follows and whether the device ID is necessary or not is discriminated. If YES, step S310 follows and the device ID is requested to the printer. Step S311 follows. The data transfer direction of the bidirectional interface 14 is set to the reverse direction (from the printer to the information processing apparatus) by a predetermined procedure specified in IEEE 1284. The device ID is received from the printer through the bidirectional interface 14.

If NO in step S309, step S312 follows and another processing is performed.

A flowchart regarding the control program stored in the ROM 23 on the printer side will now be described.

In step S401, the CPU 21 discriminates whether the Init command has been received from the information processing apparatus or not. If YES, in step S402, the operating mode is shifted to the IEEE 1284.4 mode. Step S403 follows and a check is made to see if the device ID request has been received from the information processing apparatus. If YES, step S404 follows. It is recognized that the IEEE 1284.4 error occurred, and a resetting process to cancel the data of the page which is being printed at present and subsequent pages in the data received before the device ID request is received is performed. As a resetting process, the data of the page during the printing and subsequent pages in the received data can be forcedly printed when data of a next job is transmitted. It is also possible to allow a translator unit for bit map development processing the received print data to perform the process in step S404. Step S405 follows and the IEEE 1284.4 mode is terminated. The processing routing is returned to step S401.

If NO in step S403, step S406 follows and whether the IEEE 1284.4 mode has been terminated or not is discriminated. If YES, step S405 follows. If NO, step S407 follows and another processing (printing process of the received print data or the like) is performed. The processing routine is returned to step S403.

If NO in step S401, step S408 follows and whether the device ID request has been received or not is discriminated. If YES, step S409 follows and the device ID is sent to the information processing apparatus. If NO in step S408, step S410 follows and another processing is performed.

In the embodiment, the device ID request specified in IEEE 1284 is not accompanied with the data transfer from the information processing apparatus side. Therefore, means such as an Exit command for notifying of the error occurrence cannot be erroneously recognized as a part of the print data.

Since the device ID can be negotiated even in the case where the printer side is set to a state where the bidirectional function is not used during the operation in the IEEE 1284.4 mode, the IEEE 1284.4 error can be notified to the printer side.

When the printing is performed in the IEEE 1284 mode after the IEEE 1284.4 error occurred, since the printer can know the error occurrence from the device ID request, the data and commands received before the device ID request are subjected to a cancelling process as error data, so that the illegal printing due to the erroneous recognition can be prevented.

The invention can be applied to a system comprising a plurality of equipment or an apparatus comprising one equipment. The invention can be applied to a case where it is accomplished by supplying a program to a system or an apparatus. In this case, a recording medium (for example, an FD, an ROM, a CD-ROM, etc.) on which the program according to the invention has been recorded constructs the invention. The program is read out from the memory medium and installed into the system or apparatus. By installing the program from the memory medium into the system or apparatus, the system or apparatus operates by a predetermined method.

When an error occurs in the upper layer (for example, IEEE 1284.4), the output apparatus can be allowed to certainly recognize the error by using a predetermined command (for instance, device ID request specified in IEEE 1284.4) of the lower layer.

What is claimed is:

1. An information processing apparatus that communicates with a peripheral device through an upper-layer interface and a lower-layer interface, said information processing apparatus comprising:

a command unit, arranged to issue a command to the peripheral device so as to shift the peripheral device to communication through the upper-layer interface;

a discrimination unit, arranged to discriminate whether an error has occurred during communication through the upper-layer interface; and an execution unit, arranged to (a) issue to the peripheral device a specific command used for the lower-layer interface so as to cause the peripheral device to terminate communication through the upper-layer interface, and (b) terminate communication through the upper-layer interface, if said discrimination unit discriminates that the error has occurred during communication through the upper-level interface.

2. The apparatus according to claim 1, wherein the upper-layer interface is provided for IEEE 1284.4 standards, and the lower-layer interface is provide for IEEE 1284 standards, and the specific command comprises a device ID request.

3. An apparatus according to claim 1, wherein the peripheral device comprises a printer.

4. An apparatus according to claim 1, wherein, if said discrimination unit discriminates that the error has occurred during processing through the upper-layer interface, said command unit executes a device ID request process, defined in the lower-layer interface, for informing the peripheral device of the error state and terminates the communication through the upper-layer interface.

5. An apparatus according to claim 1, wherein said command unit executes a device ID request process and receives a device ID during communication through the lower-layer interface.

6. An information processing method of an information processing apparatus that communicates with a peripheral device through an upper-layer interface and a lower-layer interface, said method comprising:

a command step of issuing a command to the peripheral device so as to shift the peripheral device to communication through the upper-layer interface;

a discrimination step of discriminating whether an error has occurred during communication through the upper-layer interface; and an execution step of (a) issuing to the peripheral device a specific command used for the lower-layer interface so as to cause the peripheral device to terminate communication through the upper-layer interface, and (b) terminate communication through the upper-layer interface, if it is discriminated in said discrimination step that the error has occurred during communication through the upper-layer interface.

7. The method according to claim 6, wherein the upper-layer interface is provided for IEEE 1284.4 standards, and the lower-layer interface is provided for IEEE 1284 standards, and the specific command comprises a device ID request.

8. The method according to claim 6, wherein the peripheral device comprises a printer.

9. The method according to claim 6, wherein, if it is discriminated in said discrimination step that the error has occurred during communication through the upper-layer interface, said command step executes a device ID request process, defined in the lower-layer interface, for informing the peripheral device of the error state and terminates the communication through the upper-layer interface.

10. The method according to claim 6, wherein said command step executes a device ID request process and receives a device ID during communication through the lower-layer interface.

11. A computer program product embodying a program for implementing an information processing method of an information processing apparatus that communicates with a peripheral device through an upper-layer interface and a lower-layer interface, said program product comprising:

a code for a command step of issuing a command to the peripheral device so as to shift the peripheral device to communication through the upper-layer interface;

a code for a discrimination step of discriminating whether an error has occurred during communication through the upper-layer interface; and an execution step of (a) issuing to the peripheral device a specific command used for the lower-layer interface so as to cause the peripheral device to terminate communication through the upper-layer interface, and (b) terminate communication through the upper-layer interface, if it is discriminated in the discrimination step that the error has occurred during communication through the upper-layer interface.

12. The program product according to claim 11, wherein the upper-layer interface is provided for IEEE 1284.4 standards, and the lower-layer interface is provided for IEEE 1284 standards, and the specific command comprises a device ID request.

13. The program product according to claim 11, wherein the peripheral device comprises a printer.

14. The program product according to claim 11, wherein, if it is discriminated in the discrimination step that the error has occurred during communication through the upper-layer interface, the command step executes a device ID request process, defined in the lower-layer interface, for informing the peripheral device of the error state and terminates the communication through the upper-layer interface.

15. The program product according to claim 11, wherein the command step executes a device ID request process and receives a device ID during communication through the lower-layer interface.

* * * * *

UNITED STATES PATENT AND TRADEMARK OFFICE
CERTIFICATE OF CORRECTION

PATENT NO. : 6,678,863 B1
DATED : January 13, 2004
INVENTOR(S) : Hideki Sugiyama It is certified that error appears in the above-identified patent and that said Letters Patent is hereby corrected as shown below:

<u>Title page,</u>
Item [57], ABSTRACT,
Line 9, "a," should read -- a --.

<u>Column 1,</u>
Line 54, "it the" should read -- if the --.

<u>Column 4,</u>
Line 3, "of the," should read -- of the --.
Line 39, "operator" should read -- operator, --.

<u>Column 5,</u>
Line 19, "IEEE." should read -- IEEE --.

<u>Column 7,</u>
Line 42, "provide" should read -- provided --.

Signed and Sealed this

Sixth Day of July, 2004

JON W. DUDAS
*Acting Director of the United States Patent and Trademark Office*